United States Patent
An

(10) Patent No.: US 10,214,159 B1
(45) Date of Patent: Feb. 26, 2019

(54) ENGINE COMPARTMENT SOUNDPROOF COVER DEVICE OF CAB-OVER TRUCK

(71) Applicants: HYUNDAI MOTOR COMPANY, Seoul (KR); KIA Motors Corporation, Seoul (KR)

(72) Inventor: Jaewoo An, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/824,699

(22) Filed: Nov. 28, 2017

(30) Foreign Application Priority Data

Sep. 29, 2017 (KR) .......................... 10-2017-0127252

(51) Int. Cl.
| | | |
|---|---|---|
| *B60R 13/08* | (2006.01) | |
| *B62D 33/067* | (2006.01) | |
| *B62D 33/06* | (2006.01) | |

(52) U.S. Cl.
CPC ........ *B60R 13/0884* (2013.01); *B62D 33/067* (2013.01); *B62D 33/0604* (2013.01)

(58) Field of Classification Search
CPC ...... B62D 33/0604; B60R 13/08; F02B 77/13
USPC ..... 180/89.19, 89.17, 89.16, 69.22; 296/39.3
See application file for complete search history.

(56) References Cited

U.S. PATENT DOCUMENTS

| | | | | |
|---|---|---|---|---|
| 3,693,602 A | * | 9/1972 | Thien .................. | F02B 77/13 123/195 C |
| 3,845,839 A | * | 11/1974 | Eriksson ............. | B63H 21/305 440/52 |
| 3,882,951 A | * | 5/1975 | Conley .................. | B60K 5/10 123/198 E |
| 3,918,541 A | * | 11/1975 | Krieger .............. | B62D 33/0604 180/69.22 |
| 4,060,142 A | * | 11/1977 | Abe ..................... | B60R 13/0838 180/68.1 |
| 4,114,714 A | * | 9/1978 | Fachbach ............... | B60K 11/00 180/68.1 |
| 4,141,427 A | * | 2/1979 | Kirchweger ........ | B60R 13/0838 180/69.22 |

(Continued)

FOREIGN PATENT DOCUMENTS

| | | |
|---|---|---|
| EP | 2008883 A1 | 12/2008 |
| JP | H04349051 A | 12/1992 |

(Continued)

*Primary Examiner* — Jeffrey J Restifo
(74) *Attorney, Agent, or Firm* — McDonnell Boehnen Hulbert & Berghoff LLP

(57) ABSTRACT

Disclosed herein is an engine compartment soundproof cover device of a cab-over truck. The engine compartment soundproof cover device includes a soundproof cover, side covers, and a plurality of expandable connectors. The soundproof cover is installed below a cab in which a driver is seated and is configured to cover an upper portion of an engine compartment. The side covers are installed on chassis frames of both sides of the engine compartment and configured to come into contact with a lower end of the soundproof cover to seal both sides of the engine compartment. The plurality of expandable connecters is configured to connect the soundproof cover to a lower portion of the cab and capable of expanding toward the side covers to allow the lower end of the soundproof cover to be pressed against the side covers.

4 Claims, 5 Drawing Sheets

(56) References Cited

U.S. PATENT DOCUMENTS

| | | | | |
|---|---|---|---|---|
| 4,445,584 | A * | 5/1984 | Kimura | B60R 13/0861 |
| | | | | 180/69.1 |
| 5,273,341 | A * | 12/1993 | Cornille, Jr. | B62D 25/105 |
| | | | | 180/69.2 |
| 5,327,988 | A * | 7/1994 | Lenz | B60K 5/04 |
| | | | | 180/89.16 |
| 6,279,978 | B1 * | 8/2001 | Schreyer | B60H 1/247 |
| | | | | 296/190.03 |
| 6,357,819 | B1 * | 3/2002 | Yoshino | B29C 44/18 |
| | | | | 296/187.02 |
| 7,399,020 | B2 * | 7/2008 | Aoyama | B60R 13/08 |
| | | | | 296/39.3 |
| 9,016,411 | B2 * | 4/2015 | Nam | B60K 11/085 |
| | | | | 165/44 |
| 2010/0060032 | A1 * | 3/2010 | Tomizawa | B60R 13/0838 |
| | | | | 296/190.04 |

FOREIGN PATENT DOCUMENTS

| | | |
|---|---|---|
| JP | H0938981 A | 2/1997 |
| JP | 2003220900 A | 8/2003 |
| JP | 2010101234 A | 5/2010 |
| JP | 2014040830 A | 3/2014 |
| KR | 10-0175542 B1 | 2/1999 |

* cited by examiner

ENGINE COMPARTMENT SOUNDPROOF COVER DEVICE OF CAB-OVER TRUCK

CROSS-REFERENCE TO RELATED APPLICATION

This application claims the benefit of Korean Patent Application No. 10-2017-0127252, filed on Sep. 29, 2017 in the Korean Intellectual Property Office, the disclosure of which is incorporated herein by reference.

BACKGROUND

1. Field

The present disclosure relates to an engine compartment soundproof cover device of a cab-over truck configured to seal an engine compartment located below a cab.

2. Description of the Related Art

A cab-over truck includes a cab above an engine compartment to allow a driver to be seated in the cab. In order to check or inspect an engine of the cab-over truck, an upper portion of the engine compartment of the cab-over truck may be opened by turning and tilting the cab forward.

A soundproof cover covering the upper portion of the engine compartment is installed below the cab to reduce engine noise. Since the soundproof cover is fixed to a lower portion of the cab, when the cab is turned and tilted forward, the soundproof cover may be rotated with the cab so that the upper portion of the engine compartment may be opened.

Since the cab is shaken while the cab-over truck is driving, a lower end of the soundproof cover installed below the cab is spaced apart from an upper structure of the engine compartment. This is for the purpose of allowing the cab to move while the cab-over truck is being driven.

However, since the lower end of the soundproof cover is spaced apart from the upper structure of the engine compartment, engine noise is leaked through a gap, so that the cab-over truck has a limitation with respect to reducing the noise and vibration.

SUMMARY

Therefore, it is an aspect of the present disclosure to provide an engine compartment soundproof cover device of a cab-over truck, which is capable of enhancing the sealing of an upper portion of an engine compartment to improve soundproofing.

Additional aspects of the disclosure will be set forth in part in the description which follows and, in part, will be obvious from the description, or may be learned by practice of the disclosure.

In accordance with one aspect of the present disclosure, an engine compartment soundproof cover device of a cab-over truck includes: a soundproof cover installed below a cab in which a driver is seated and configured to cover an upper portion of an engine compartment, the engine compartment having two sides; side covers installed on chassis frames located at both sides of the engine compartment and configured to come into contact with a lower end of the soundproof cover to seal the both sides of the engine compartment; and a plurality of expandable connecters configured to connect the soundproof cover to a lower portion of the cab and capable of expanding toward the side covers to allow the lower end of the soundproof cover to be pressed against the side covers.

The plurality of expandable connecters may expand when the cab is opened to allow the lower end of the soundproof cover to be spaced apart from the side covers and may press the soundproof cover toward the side covers in a contracted state when the cab is closed to allow the lower end of the soundproof cover to make contact with the side covers.

The plurality of expandable connecters may include a gas lifter having one end connected to the lower portion of the cab and the other end connected to an outer surface of the soundproof cover and configured to expand in a longitudinal direction thereof.

The engine compartment soundproof cover device may further include a sealing member coupled to the lower end of the soundproof cover that is in contact with the side covers.

An upper outer surface of the soundproof cover may be kept spaced apart from a lower surface of a floor panel of the cab.

BRIEF DESCRIPTION OF THE DRAWINGS

These and other aspects of the disclosure will become apparent and more readily appreciated from the following description of the embodiments, taken in conjunction with the accompanying drawings of which.

DETAILED DESCRIPTION

Figure 1:
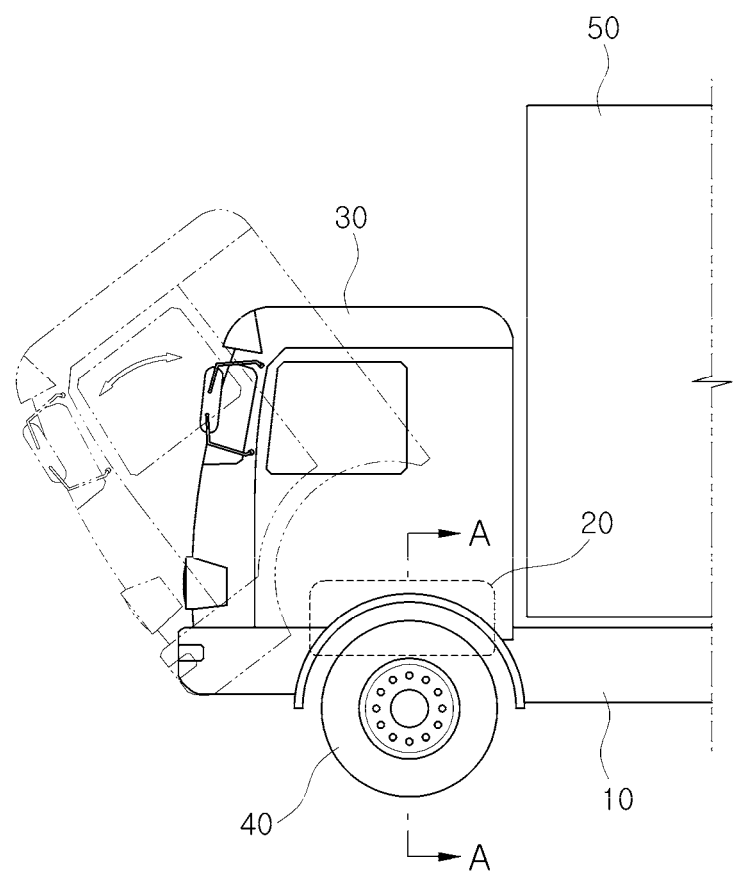
FIG. 1 is a side view illustrating a cab-over truck to which an engine compartment soundproof cover device in accordance with one embodiment of the present disclosure is applied.

Hereinafter, embodiments of the present disclosure will be described in detail with reference to the accompanying drawings. The following embodiments will be presented to allow those skilled in the art to sufficiently understand the technical concepts of the present disclosure. However, the present disclosure is not limited to the embodiments set forth herein and may be modified variously in many different forms. In the drawings, portions irrelevant to the description will not be shown in order to make the present disclosure clear, and sizes of components may be somewhat exaggerated in order to help understanding the present disclosure.

FIG. 1 is a side view illustrating a cab-over truck to which an engine compartment soundproof cover device in accordance with one embodiment of the present disclosure is applied. As shown in FIG. 1, the cab-over truck includes an engine 20 installed in front of a chassis frame 10, and a cab 30 installed at a front side of the vehicle to cover an upper portion of the engine 20 and provided therein with a space in which a driver is seated. In FIG. 1, reference numeral 40 denotes a front wheel and reference numeral 50 denotes a loading part configured to contain a cargo load.

A front lower side of the cab 30 may be rotatably connected to the chassis frame 10 by a hinge. The cab 30 may be rotated and tilted forward such that an upper portion of an engine compartment is opened in order to check or inspect the engine 20.

Figure 2:
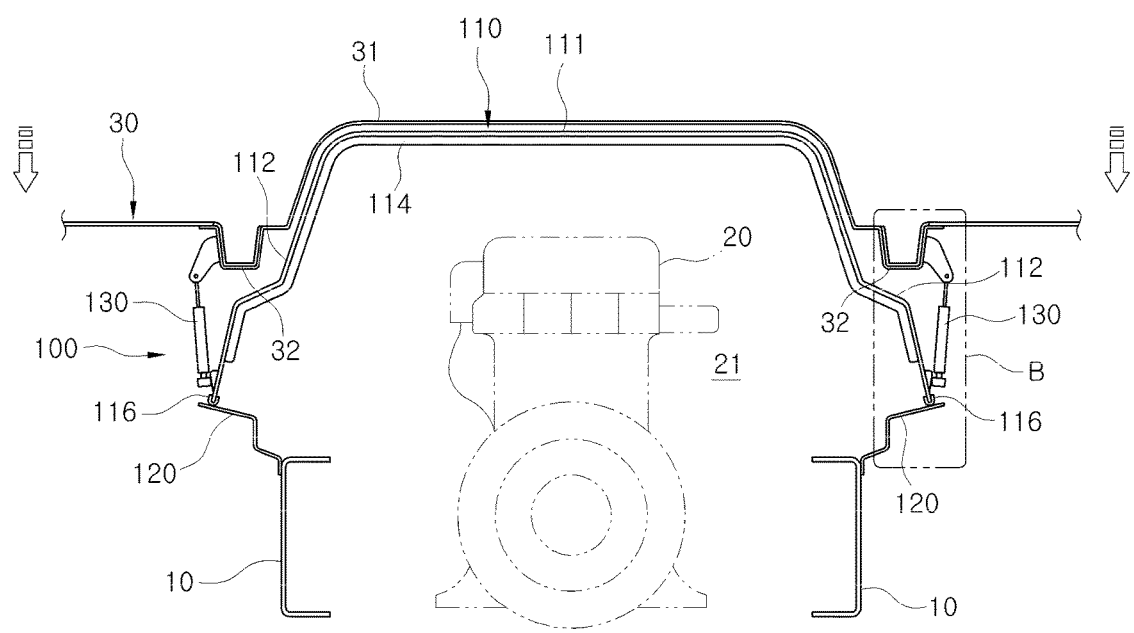
FIG. 2 is a sectional view taken along line A-A of FIG. 1 and illustrating a state in which a cab is closed to allow the engine compartment soundproof cover device to seal an upper portion of an engine compartment.
Figure 3:
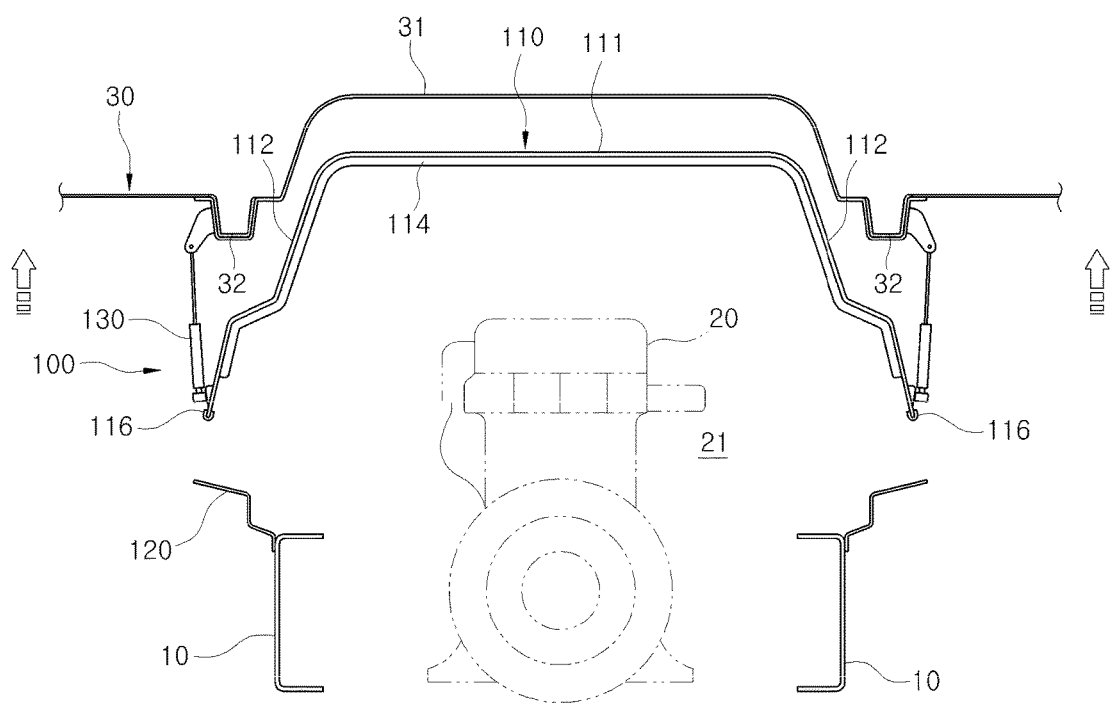
FIG. 3 is a sectional view taken along line A-A of FIG. 1 and illustrating a state in which the cab is opened to allow the engine compartment soundproof cover device to open the upper portion of the engine compartment.
Figure 4:
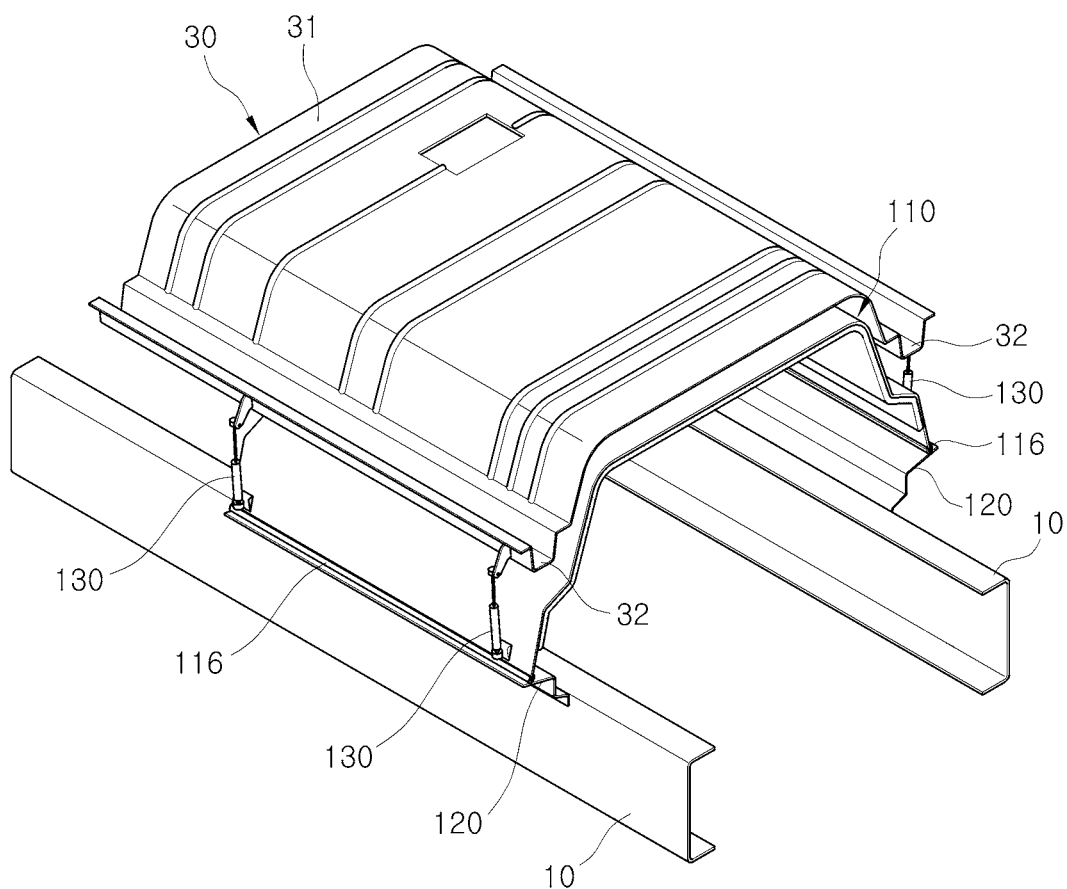
FIG. 4 is a perspective view illustrating the engine compartment soundproof cover device in accordance with one embodiment of the present disclosure.

FIGS. 2 and 3 are sectional views taken along line A-A of FIG. 1. FIG. 2 illustrates a state in which the cab is closed to allow the engine compartment soundproof cover device to seal the upper portion of the engine compartment. FIG. 3 illustrates a state in which the cab is opened to allow the engine compartment soundproof cover device to open the upper portion of the engine compartment. FIG. 4 is a perspective view of the engine compartment soundproof cover device.

Referring to FIGS. 2 to 4, the engine compartment soundproof cover device 100 may include a soundproof cover 110, side covers 120, and a plurality of expandable connecters 130 configured to connect the soundproof cover 110 to the cab 30.

The soundproof cover 110 is installed below a floor panel 31 of the cab 30 to cover an upper portion of the engine compartment 21 in which the engine 20 is placed when the cab 30 is closed. The soundproof cover 110 may include an upper portion 111 placed above the engine 20 and a side portion 112 bent and extending downwardly from both ends of the upper portion 111. A sound absorbing material 114 may be attached to an inner surface of the soundproof cover 110 to prevent heat of the engine 20 from being transferred to the cab 30 while absorbing engine noise and preventing the engine noise from leaking to the outside.

The side covers 120 are installed at the chassis frames 10 at both sides of the engine compartment 21, and are in contact with lower ends of the soundproof cover 110 to seal the sides of the engine compartment 21. That is, both side covers 120 extend toward the lower end of the soundproof cover 110 in a state in which one of the both side covers 120 is fixed to the chassis frame 10. Thus, when the soundproof cover 110 is moved downwardly by closing the cab 30, the lower end of the soundproof cover 110 comes into contact with a top surface of the side cover 120 so that the soundproof cover 110 is sealed.

Figure 5:
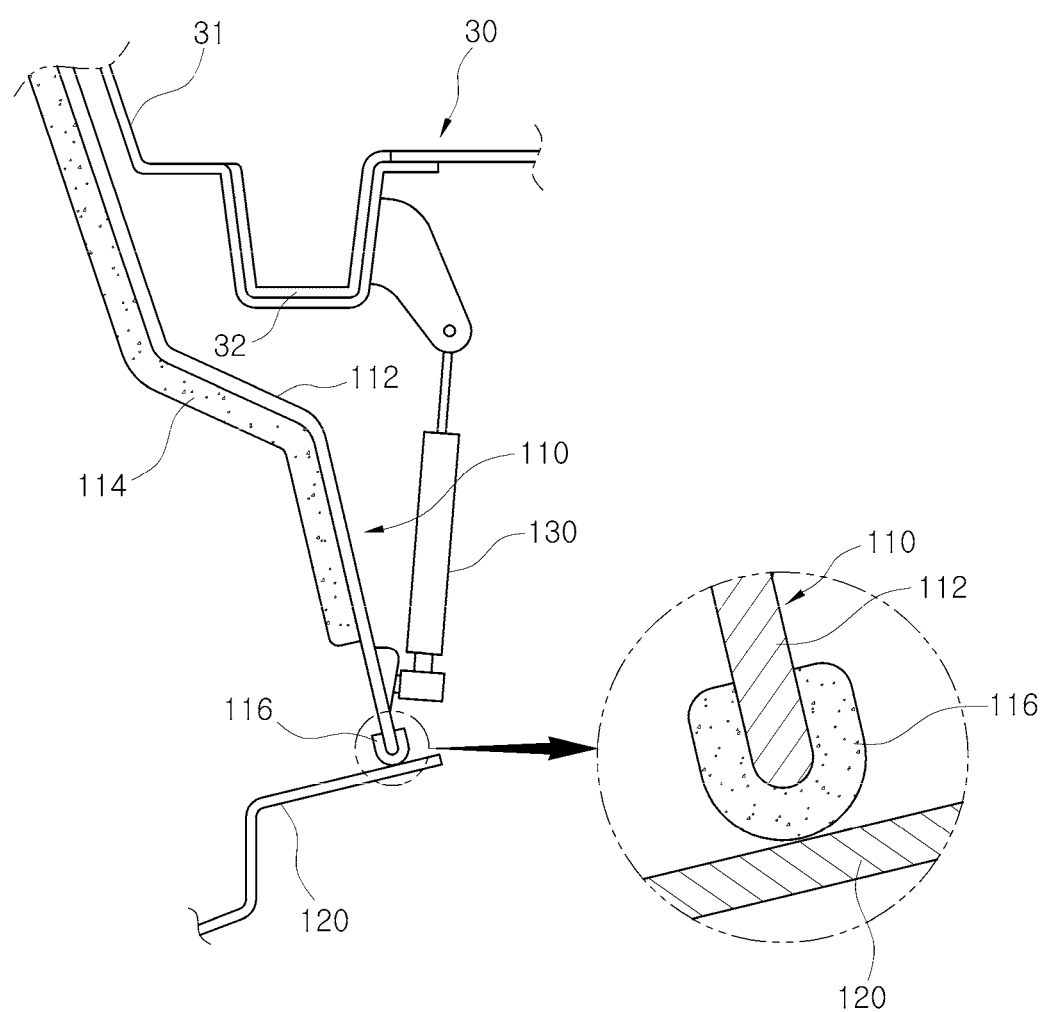
FIG. 5 is a detailed view of a portion B of FIG. 2.

As shown in FIG. 5, a sealing member 116, which is in contact with the side cover 120 to enhance a sealing effect, may be installed at the lower end of the soundproof cover 110. The sealing member 116 may be formed of an elastic material such as rubber or silicone.

As shown in FIGS. 2 and 3, the plurality of expandable connecters 130 connect the soundproof cover 110 to a lower portion of the cab 30 and is capable of expanding toward the side cover 120 (downward) to allow the lower end of the soundproof cover 110 to be pressed against the side cover 120.

As shown in FIGS. 4 and 5, the plurality of expandable connecters 130 may include a gas lifter expanding in a longitudinal direction and having an upper portion connected to a frame 32 provided integrally with the floor panel 31 of the cab 30 and a lower portion connected to an outer surface of the side portion 112 of the soundproof cover 110.

As shown in FIG. 4, since the plurality of expandable connecters 130 are installed at locations to be spaced apart from each other, the expandable connecters 130 may stably support the soundproof cover 110. Since the plurality of expandable connecters 130 evenly press the entire lower end of the soundproof cover 110 toward the side cover 120, the sealing effect may be improved.

Although the gas lifter is presented as one example of the expandable connecter 130 in the embodiment, the embodiment is not limited to the form of the expandable connecter 130. The expandable connecter 130 may be in the form of a cylinder expandable in the longitudinal direction by using expandability of a compression coil spring.

As illustrated in FIG. 3, the expandable connecter 130 expands when the lower end of the soundproof cover 110 is spaced apart from the side cover 120 by opening the cab 30. As illustrated in FIG. 2, when the cab 30 is closed such that the lower end of the soundproof cover 110 comes into contact with the side cover 120, the expandable connecter 130, in a contracted state, presses the soundproof cover 110 toward the side cover 120.

As described above, in the engine compartment soundproof cover device 100 in accordance with the embodiment, the expandable connecters 130 press the soundproof cover 110 toward the side cover 120 in a state in which the cab 30 is closed, so that the lower end of the soundproof cover 110 is pressed against the side cover 120. Thus, even when the cab 30 is shaken while the cab-over truck is being driven, the sealing of the upper portion of the engine compartment 21 may be enhanced to improve the soundproof effect. In other words, the engine noise to be transferred to the outside may be minimized.

In a conventional cab-over truck, since engine noise is emitted to both sides of an engine compartment, a sound absorbing material is required to be attached to an entire lower surface of a floor panel of a cab. However, when the engine compartment soundproof cover device 100 in accordance with the embodiment is applied, since the sealing of the upper portion of the engine compartment 21 prevents the engine noise from being emitted to the sides of the engine compartment 21, it is possible to omit the sound absorbing material that is attached to both sides of the lower surface (both sides of the lower surface except an upper surface of the engine compartment) of the floor panel 31. Thus, since an attachment area of the sound absorbing material is reduced in comparison with the conventional case, the manufacturing costs of the cab-over truck can be reduced.

As shown in FIGS. 2 and 3, in the engine compartment soundproof cover device 100 in accordance with an embodiment, an upper outer surface of the soundproof cover 110 is always kept spaced apart from the lower surface of the floor panel 31 of the cab 30. Thus, the heat of the engine 20 transferred to the soundproof cover 110 may be prevented from being transferred to the floor panel 31 of the cab 30. In addition, since the floor panel 31 of the cab 30 and the soundproof cover 110 are spaced apart from each other, even when the cab 30 is shaken while the truck is being driven, noise caused by a contact between the floor panel 31 and the soundproof cover 110 may be prevented from being generated.

As is apparent from the above description, in an engine compartment soundproof cover device of a cab-over truck in accordance with the embodiment of the present disclosure, since an expandable connecter presses a soundproof cover toward a side cover so that a lower end of the soundproof cover is pressed against the side cover, even when a cab is shaken while the cab-over truck is being driven, an upper portion of an engine compartment can be effectively sealed, thereby improving soundproofing.

As is apparent from the above description, in an engine compartment soundproof cover device of a cab-over truck in accordance with the embodiment of the present disclosure, since an upper outer surface of a soundproof cover is always kept spaced apart from a lower surface of a floor panel of a cab, the heat from the engine transferred to the soundproof cover can be prevented from being transferred to the floor panel of the cab.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. An engine compartment soundproof cover device of a cab-over truck, the engine compartment soundproof cover device comprising:
    a soundproof cover installed below a cab in which a driver is seated and configured to cover an upper portion of an engine compartment, the engine compartment having two sides;
    side covers installed on chassis frames located at both sides of the engine compartment and configured to come into contact with a lower end of the soundproof cover to seal the both sides of the engine compartment; and
    a plurality of expandable connecters configured to connect the soundproof cover to a lower portion of the cab and capable of expanding toward the side covers to allow the lower end of the soundproof cover to be pressed against the side covers;
    wherein the plurality of expandable connecters include a gas lifter having one end connected to the lower portion of the cab and the other end connected to an outer surface of the soundproof cover and configured to expand in a longitudinal direction thereof.

2. The engine compartment soundproof cover device according to claim 1, wherein the plurality of expandable connecters expand when the cab is opened to allow the lower end of the soundproof cover to be spaced apart from the side covers and press the soundproof cover toward the side covers in a contracted state when the cab is closed to allow the lower end of the soundproof cover to come into contact with the side covers.

3. The engine compartment soundproof cover device according to claim 1, further comprising a sealing member coupled to the lower end of the soundproof cover that is in contact with the side covers.

4. The engine compartment soundproof cover device according to claim 1, wherein an upper outer surface of the soundproof cover is kept spaced apart from a lower surface of a floor panel of the cab.

* * * * *